United States Patent
Takada et al.

(10) Patent No.: US 10,338,430 B2
(45) Date of Patent: *Jul. 2, 2019

(54) LIQUID CRYSTAL DISPLAY APPARATUS

(71) Applicant: NITTO DENKO CORPORATION, Ibaraki-shi, Osaka (JP)

(72) Inventors: Katsunori Takada, Ibaraki (JP); Eiko Suefusa, Ibaraki (JP); Yoshitsugu Kitamura, Ibaraki (JP); Keisuke Kimura, Ibaraki (JP); Seiji Umemoto, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/766,081

(22) PCT Filed: Apr. 10, 2017

(86) PCT No.: PCT/JP2017/014642
§ 371 (c)(1),
(2) Date: Apr. 5, 2018

(87) PCT Pub. No.: WO2017/183500
PCT Pub. Date: Oct. 26, 2017

(65) Prior Publication Data
US 2018/0307095 A1    Oct. 25, 2018

(30) Foreign Application Priority Data

Apr. 18, 2016 (JP) ................................. 2016-083235
Feb. 22, 2017 (JP) ................................. 2017-030728

(51) Int. Cl.
*G02B 5/30* (2006.01)
*G02F 1/1333* (2006.01)
(Continued)

(52) U.S. Cl.
CPC ......... *G02F 1/133528* (2013.01); *G02B 5/30* (2013.01); *G02F 1/1333* (2013.01);
(Continued)

(58) Field of Classification Search
CPC .... G02B 5/3033; G02B 5/3025; G02B 27/26; G02B 5/3083; Y10T 428/1041;
(Continued)

(56) References Cited

U.S. PATENT DOCUMENTS 6,081,312 A    6/2000 Aminaka et al.
9,091,883 B2   7/2015 Weindorf et al.
(Continued)

FOREIGN PATENT DOCUMENTS

JP    2010-79087 A     4/2010
JP    2011-127072 A    6/2011
(Continued)

OTHER PUBLICATIONS

International Search Report dated Jun. 27, 2017, issued in counterpart application No. PCT/JP2017/014642, w/English translation. (3 pages).
(Continued)

*Primary Examiner* — Jia X Pan
(74) *Attorney, Agent, or Firm* — Westerman, Hattori, Daniels & Adrian, LLP

(57) ABSTRACT

There is provided a liquid crystal display apparatus having the following feature: although the liquid crystal display apparatus has a step between its display screen and outermost surface, the step is hardly recognized; and the liquid crystal display apparatus can achieve bright display. A liquid crystal display apparatus according to the present invention includes a liquid crystal cell; a first polarizer arranged on a back surface side of the liquid crystal cell; a second polarizer arranged on a viewer side of the liquid crystal cell; a cover (Continued)

sheet arranged on a viewer side of the second polarizer, the cover sheet having an opening portion at a position corresponding to a display region of the liquid crystal cell; and a third polarizer arranged on a viewer side of the cover sheet to cover the opening portion, wherein the opening portion of the cover sheet is filled with a pressure-sensitive adhesive.

4 Claims, 3 Drawing Sheets

(51) Int. Cl.
  *G02F 1/1335* (2006.01)
  *G02F 1/1337* (2006.01)
(52) U.S. Cl.
  CPC .......... *G02F 1/1335* (2013.01); *G02F 1/1337* (2013.01); *G02F 2001/133738* (2013.01); *G02F 2001/133742* (2013.01); *G02F 2201/50* (2013.01); *G02F 2202/28* (2013.01)
(58) Field of Classification Search
  CPC ........... G02F 1/133528; G02F 1/13362; G02F 2001/133541; G02F 1/13363; G02F 2202/40; G02F 2001/133638; G02F 2202/28; G02F 2201/50
  See application file for complete search history.

(56) References Cited

U.S. PATENT DOCUMENTS

| | | | |
|---|---|---|---|
| 2009/0033821 A1* | 2/2009 | Lee | G02F 1/134309 349/48 |
| 2009/0033824 A1* | 2/2009 | Nishikawa | G02F 1/133308 349/58 |
| 2011/0285640 A1* | 11/2011 | Park | G02F 1/13338 345/173 |
| 2012/0329970 A1* | 12/2012 | Kishioka | B32B 7/12 526/264 |
| 2014/0022491 A1* | 1/2014 | Wiendorf | G02F 1/133617 349/62 |
| 2016/0004122 A1* | 1/2016 | Ono | G02F 1/133528 349/96 |
| 2017/0168356 A1* | 6/2017 | Yang | G02F 1/13338 |

FOREIGN PATENT DOCUMENTS

| | | |
|---|---|---|
| JP | 2012-47895 A | 3/2012 |
| JP | 5877433 B2 | 3/2016 |

OTHER PUBLICATIONS

International Search Report dated Jun. 27, 2017, issued in applicatioin No. PCT/JP2017/014641(1 page) counterpart of U.S. Appl. No. 15/766,084.

International Search Report dated Jun. 27, 2017, issued in International Application No. PCT/JP2017/014640 (1 page) counterpart of U.S. Appl. No. 15/766,096.

Office Action dated Nov. 2, 2018, issued in U.S. Appl. No. 15/766,084 (7 pages).

Office Action dated Oct. 22, 2018, issued in U.S. Appl. No. 15/766,096 (14 pages).

* cited by examiner

LIQUID CRYSTAL DISPLAY APPARATUS

TECHNICAL FIELD

The present invention relates to a liquid crystal display apparatus.

BACKGROUND ART

A liquid crystal display apparatus has been used in a wide variety of applications including a television, a smart phone, a personal computer monitor, and a digital camera, and the applications have been further expanding. As a result, such forms that the liquid crystal display apparatus is embedded in various structures have been adopted in some applications of the liquid crystal display apparatus. Specific examples of such applications include: an operation information screen in a railway vehicle (e.g., the next-station guide display of a passenger vehicle); display portions, such as various meters and a navigation system arranged in the instrument panel and console of an automobile; various meters of the cockpit of an airplane; and a monitor arranged in a hospital, a security office, a combat information center, or the like. In each of such forms, in response to a demand in terms of the protection and/or design of the liquid crystal display apparatus, a cover sheet having an opening portion corresponding to a display region of the liquid crystal display apparatus may be arranged on the viewer side of the liquid crystal display apparatus as required. In each of such forms, a step occurs between the outermost surface of a portion having embedded therein the liquid crystal display apparatus (e.g., the outermost surface of a casing, a wall, a monitor desk, or the cover sheet arranged as required) and the display screen of the apparatus, and the step may affect the viewability of the apparatus depending on an application and/or a situation. A technology involving arranging a neutral density filter on the viewer side has been proposed for making it difficult to recognize the step (Patent Literature 1). However, the technology involves a problem in that the display screen itself darkens, though it becomes difficult to recognize the step.

CITATION LIST

Patent Literature

[PTL 1] JP 5877433 B2

SUMMARY OF INVENTION

Technical Problem

The present invention has been made to solve the conventional problem, and an object of the present invention is to provide a liquid crystal display apparatus having the following feature: although the liquid crystal display apparatus has a step between its display screen and outermost surface, the step is hardly recognized; and the liquid crystal display apparatus can achieve bright display.

Solution to Problem

According to one aspect of the present invention, a liquid crystal display apparatus is provided. The liquid crystal display apparatus includes a liquid crystal cell; a first polarizer arranged on a back surface side of the liquid crystal cell; a second polarizer arranged on a viewer side of the liquid crystal cell; a cover sheet arranged on a viewer side of the second polarizer, the cover sheet having an opening portion at a position corresponding to a display region of the liquid crystal cell; and a third polarizer arranged on a viewer side of the cover sheet to cover the opening portion, wherein the opening portion of the cover sheet is filled with a pressure-sensitive adhesive.

In one embodiment of the invention, the pressure-sensitive adhesive includes part of a pressure-sensitive adhesive layer arranged between the cover sheet and the third polarizer.

In one embodiment of the invention, the pressure-sensitive adhesive has a refractive index of from 1.30 to 1.70.

In one embodiment of the invention, a difference between a refractive index of the pressure-sensitive adhesive and a refractive index of a layer adjacent to the pressure-sensitive adhesive is 0.2 or less.

Advantageous Effects of Invention

According to the present invention, in a liquid crystal display apparatus having a step between its display screen and outermost surface due to a cover sheet having an opening portion, a polarizer is arranged on the viewer side of the step and the opening portion is filled with a pressure-sensitive adhesive. Accordingly, while the brightness of the display screen is maintained, the step is made difficult to recognize and hence the viewability of the apparatus can be improved.

DESCRIPTION OF EMBODIMENTS

Now, embodiments of the present invention are described with reference to the drawings. However, the present invention is not limited to these embodiments.

A. Overall Configuration of Liquid Crystal Display Apparatus

Figure 1:
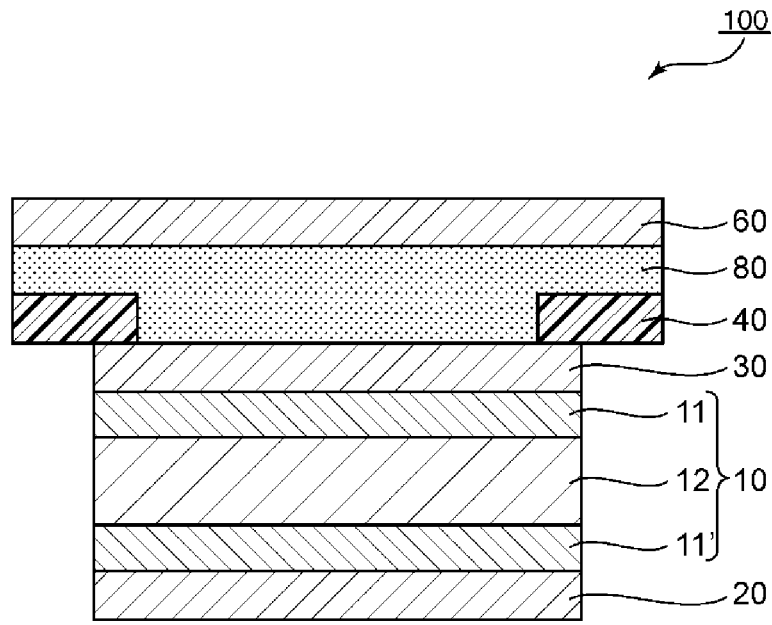
FIG. 1 is a schematic sectional view of a liquid crystal display apparatus according to one embodiment of the present invention.

FIG. 1 is a schematic sectional view of a liquid crystal display apparatus according to one embodiment of the present invention. A liquid crystal display apparatus 100 includes: a liquid crystal cell 10; a first polarizer 20 arranged on the back surface side of the liquid crystal cell 10; a second polarizer 30 arranged on the viewer side of the liquid crystal cell 10; a cover sheet 40 arranged on the viewer side of the second polarizer 30; and a third polarizer 60 arranged on the viewer side of the cover sheet 40. The cover sheet 40 has an opening portion at a position corresponding to the display region of the liquid crystal cell 10. The third polarizer 60 is arranged to cover the opening portion of the cover sheet 40. According to the embodiment of the present invention, the third polarizer is arranged on the outermost surface side of the apparatus to cover the opening portion of the cover sheet, and hence a step due to the cover sheet (opening portion) is made difficult to recognize. As a result, the viewability of the liquid crystal display apparatus can be improved. In more detail, in addition to the fact that the step is made difficult to recognize by covering the opening portion of the cover sheet to smoothen the outermost surface, the step can be made more difficult to recognize by virtue of a transmittance intrinsic to the polarizer. In addition, the polarizer can efficiently transmit polarized light in a predetermined direction, and hence the brightness of the display screen of the apparatus can be maintained as compared to a neutral density filter configured to entirely reduce light. The phrase "the step is made difficult to recognize" is hereinafter sometimes referred to as "a visual step is reduced."

In the embodiment of the present invention, a pressure-sensitive adhesive fills the opening portion of the cover sheet 40. The pressure-sensitive adhesive may fill only the opening portion, or may be part of a pressure-sensitive adhesive layer 80 arranged between the cover sheet 40 and the third polarizer 60. With such configuration, an air layer formed by the opening portion is eliminated, and hence reflection and/or refraction at a layer interface can be suppressed. As a result, the visual step of the apparatus can be more significantly reduced while the brightness of the display screen is maintained. The refractive index of the pressure-sensitive adhesive is preferably from 1.30 to 1.70, more preferably from 1.40 to 1.60, still more preferably from 1.45 to 1.55. When the refractive index of the pressure-sensitive adhesive is set within such range, the reflection and/or the refraction at the layer interface can be further suppressed, and hence balance between the brightness of the display screen and the visual step can be more excellent.

In the liquid crystal display apparatus according to the embodiment of the present invention, the absorption axis direction of the second polarizer 30 and the absorption axis direction of the third polarizer 60 may have any appropriate angle in accordance with purposes. The absorption axis direction of the second polarizer 30 and the absorption axis direction of the third polarizer 60 are typically substantially perpendicular or parallel to each other, and are preferably substantially parallel to each other. With such configuration, the visual step can be reduced while the brightness of the display screen is maintained. Further, in the liquid crystal display apparatus according to the embodiment of the present invention, the absorption axis direction of the first polarizer 20 and the absorption axis direction of the second polarizer 30 are substantially perpendicular or parallel to each other, and are typically substantially perpendicular to each other. The expressions "substantially perpendicular" and "almost perpendicular" as used herein each comprehend a case in which an angle formed by two directions is 90°±10°, and the angle is preferably 90°±7°, more preferably 90°±5°. The expressions "substantially parallel" and "almost parallel" as used herein each comprehend a case in which an angle formed by two directions is 0°±10°, and the angle is preferably 0°±7°, more preferably 0°±5°. Further, the simple expression "perpendicular" or "parallel" as used herein may include a substantially perpendicular or substantially parallel state.

The liquid crystal display apparatus according to the embodiment of the present invention may be in a so-called O mode or a so-called E mode. The term "liquid crystal display apparatus in the O mode" refers to a liquid crystal display apparatus in which the absorption axis direction of the polarizer arranged on the light source side of the liquid crystal cell is substantially parallel to the initial alignment direction of the liquid crystal cell. The term "liquid crystal display apparatus in the E mode" refers to a liquid crystal display apparatus in which the absorption axis direction of the polarizer arranged on the light source side of the liquid crystal cell is substantially perpendicular to the initial alignment direction of the liquid crystal cell. The term "initial alignment direction of the liquid crystal cell" refers to a direction in which in absence of the electric field, the in-plane refractive index of the liquid crystal layer obtained as a result of alignment of liquid crystal molecules contained in the liquid crystal layer becomes maximum (i.e., a slow axis direction).

Figure 2:
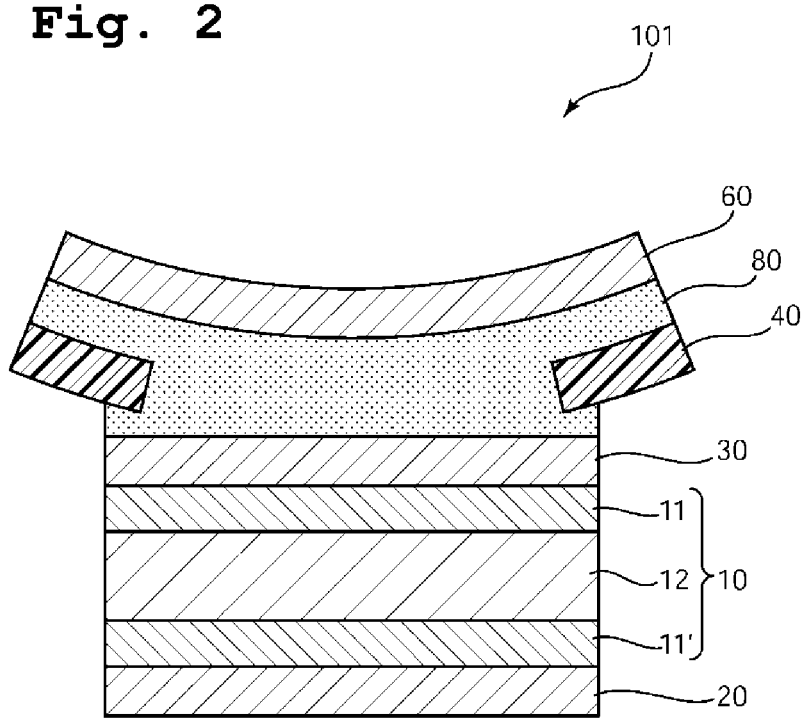
FIG. 2 is a schematic sectional view of a liquid crystal display apparatus according to another embodiment of the present invention.
Figure 3:
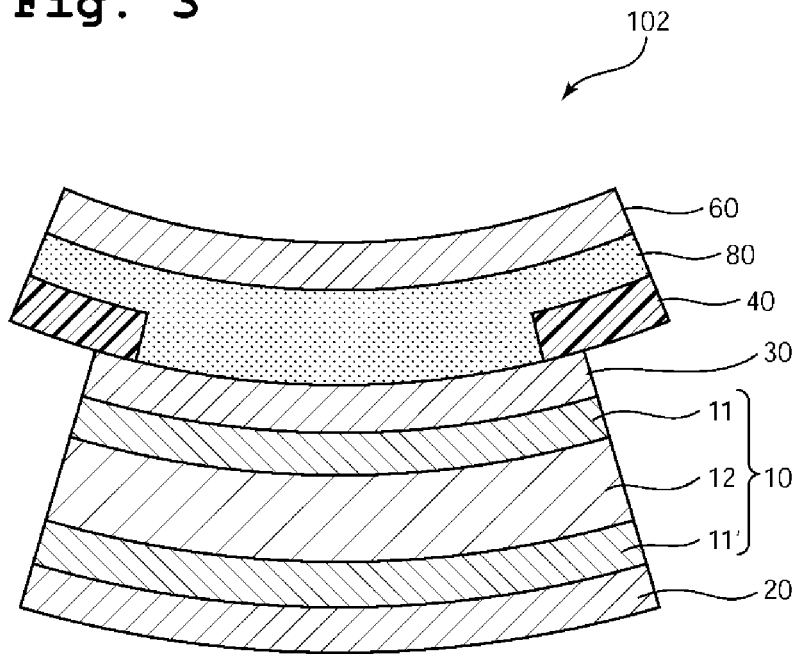
FIG. 3 is a schematic sectional view of a liquid crystal display apparatus according to still another embodiment of the present invention.

FIG. 2 is a schematic sectional view of a liquid crystal display apparatus according to another embodiment of the present invention. In a liquid crystal display apparatus 101, the cover sheet 40 is curved, and the third polarizer 60 is curved along the cover sheet 40. The pressure-sensitive adhesive preferably fills a gap between the cover sheet 40 and the second polarizer 30 produced by the curving of the cover sheet 40. The cover sheet 40 may be curved in any appropriate form. Specifically, the cover sheet may be curved so that its viewer side may be convex, or may be curved so that its viewer side may be concave. In addition, the cover sheet 40 may be curved about any direction in its surface. Further, the liquid crystal cell 10, the first polarizer 20, and the second polarizer 30 may be curved along the cover sheet 40 like a liquid crystal display apparatus 102 illustrated in FIG. 3. The liquid crystal display apparatus 101 and 102 of this embodiment in each of which the cover sheet is curved have wide selection ranges of design and hence have high commercial values.

Figure 4:
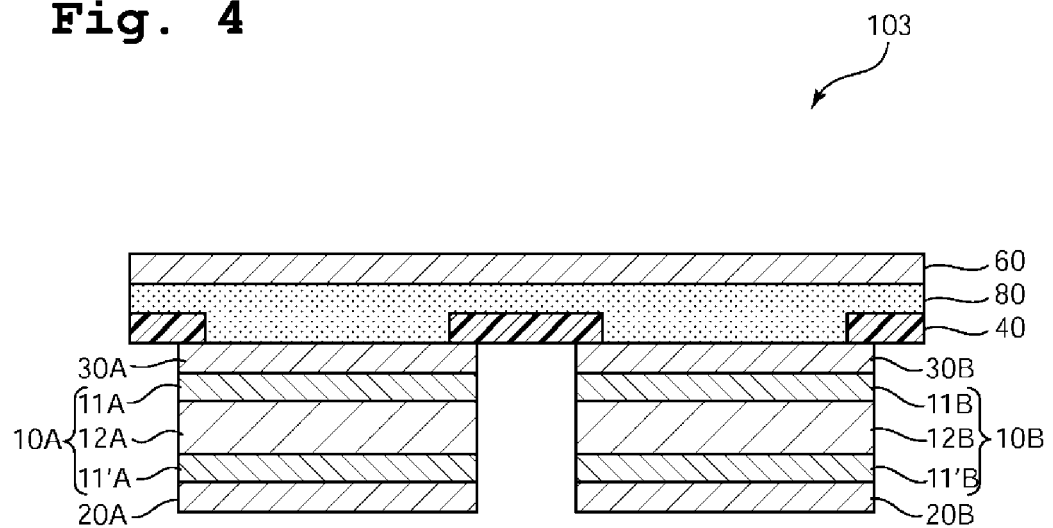
FIG. 4 is a schematic sectional view of a liquid crystal display apparatus according to still another embodiment of the present invention.

FIG. 4 is a schematic sectional view of a liquid crystal display apparatus according to still another embodiment of the present invention. A liquid crystal display apparatus 103 includes: a liquid crystal cell 10A; a first polarizer 20A arranged on the back surface side of the liquid crystal cell 10A; a second polarizer 30A arranged on the viewer side of the liquid crystal cell 10A; a liquid crystal cell 10B; a first polarizer 20B arranged on the back surface side of the liquid crystal cell 10B; a second polarizer 30B arranged on the viewer side of the liquid crystal cell 10B; the cover sheet 40 arranged on the viewer sides of the second polarizers 30A and 30B; and the third polarizer 60 arranged on the viewer side of the cover sheet 40. The cover sheet 40 of the liquid crystal display apparatus 103 includes a first transmission portion 42A at a position corresponding to the display region of the liquid crystal cell 10A, and includes a second transmission portion 42B at a position corresponding to the display region of the liquid crystal cell 10B. The liquid crystal display apparatus 103 has two display screens corresponding to the respective liquid crystal cells, and the third polarizer is arranged on its outermost surface side to cover the two transmission portions of the cover sheet. Accordingly, a step between the outermost surface of the apparatus and each of the two display screens is made difficult to recognize, and hence viewability in each of the two display screens can be improved. Although description has been given by taking a liquid crystal display apparatus having two display screens and two liquid crystal cells corresponding thereto as an example, the liquid crystal display apparatus of the present invention may have three or more display screens and their corresponding liquid crystal cells.

Figure 5:
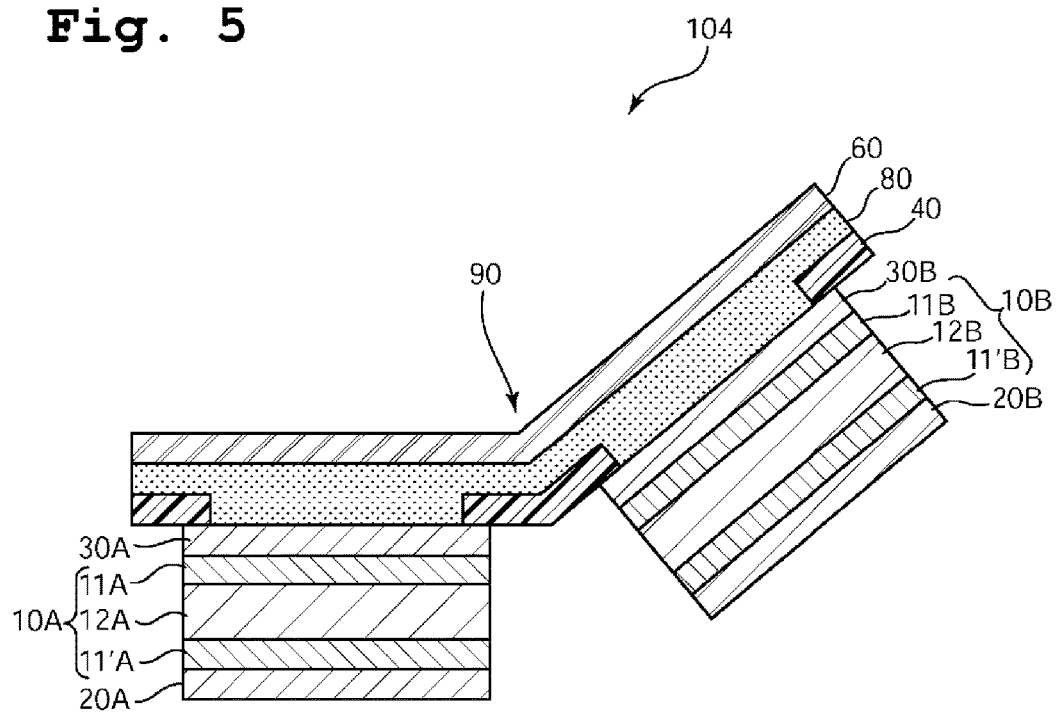
FIG. 5 is a schematic sectional view of a liquid crystal display apparatus according to still another embodiment of the present invention.

FIG. 5 is a schematic sectional view of a liquid crystal display apparatus according to still another embodiment of the present invention. A liquid crystal display apparatus 104 of this embodiment has two display screens as in the liquid crystal display apparatus 103. Further, in this embodiment, the cover sheet 40 is bent at a bending portion 90 between the transmission portion 42A and the transmission portion 42B, and the third polarizer 60 is bent along the cover sheet 40. Thus, the liquid crystal display apparatus 104 can display images toward different directions with the two display screens. The liquid crystal display apparatus of the present invention may be as follows: the cover sheet has a plurality of bending portions, and the apparatus has three or more display screens and their corresponding liquid crystal cells across the respective bending portions.

The liquid crystal display apparatus according to any one of the embodiments of the present invention may be used by, for example, being incorporated into (typically, embedded in) various structures. Specific examples of the structures include: a building structure (e.g., the wall of a security office or a combat information center); a railway vehicle (e.g., the wall of the upper portion of a door); an automobile (e.g., an instrument panel or a console); an airplane (e.g., a cockpit); a household electric appliance; and AV equipment.

The liquid crystal display apparatus according to any one of the embodiments of the present invention practically further includes a backlight unit (not shown). The backlight unit typically includes a light source and a light guide plate. The backlight unit may further include any appropriate other member (e.g., a diffusion sheet or a prism sheet).

The liquid crystal display apparatus according to any one of the embodiments of the present invention may further include any appropriate other member. For example, a so-called λ/4 plate may be arranged between the second polarizer 30 and the cover sheet 40, and/or between the cover sheet 40 (substantially, the pressure-sensitive adhesive layer 80) and the third polarizer 60. With such configuration, the visual step can be further reduced. The λ/4 plate may be replaced with a laminate of the λ/4 plate and a λ/2 plate. In addition, for example, an optical compensation layer (retardation film) other than the λ/4 plate may be further arranged. The optical characteristics, number, combination, arrangement positions, and the like of the other optical compensation layers may be appropriately selected in accordance with, for example, purposes and desired optical characteristics. In addition, for example, various surface treatment layers may be arranged on the outermost surface of the apparatus. Specific examples of the surface treatment layers include an antiglare layer, an antireflection layer, and a hard coat layer. A plurality of surface treatment layers may be arranged. The kinds, number, combination, and the like of the surface treatment layers may be appropriately selected in accordance with purposes.

Figure 6:
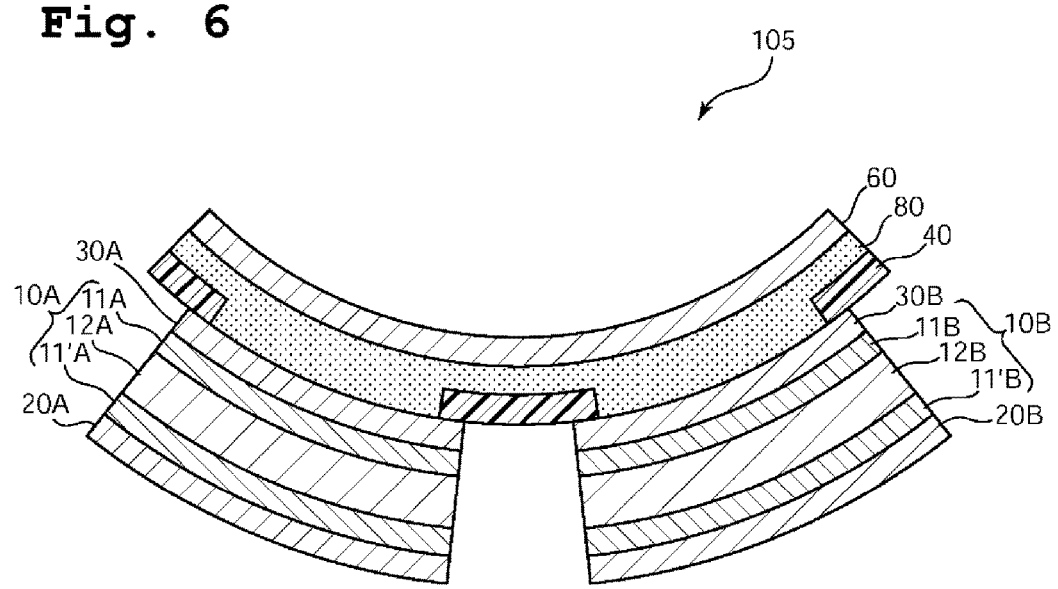
FIG. 6 is a schematic sectional view of a liquid crystal display apparatus according to still another embodiment of the present invention.

The above-mentioned embodiments may be appropriately combined, or configurations in the above-mentioned embodiments may be replaced with optically equivalent configurations. For example, the embodiment of FIG. 3 and the embodiment of FIG. 4 may be combined like FIG. 6. Specifically, a liquid crystal display apparatus 105 of FIG. 6 includes the liquid crystal cell 10A and the liquid crystal cell 10B, each configuration is curved, and the cover sheet 40 includes the first transmission portion 42A at the position corresponding to the display region of the liquid crystal cell 10A, and includes the second transmission portion 42B at the position corresponding to the display region of the liquid crystal cell 10B. The configuration of a liquid crystal display apparatus well-known and commonly used in the art may be adopted for matters that are not described herein.

Each member and each optical film forming the liquid crystal display apparatus are described below.

B. Liquid Crystal Cell

The liquid crystal cell 10 has a pair of substrates 11 and 11', and a liquid crystal layer 12 serving as a display medium interposed between the substrates. In a general configuration, a color filter and a black matrix are arranged on one substrate, and a switching element configured to control the electro-optical characteristics of liquid crystal, a scanning line configured to apply a gate signal to the switching element and a signal line configured to apply a source signal thereto, and a pixel electrode and a counter electrode are arranged on the other substrate. An interval (cell gap) between the substrates is controlled by a spacer or the like. For example, an alignment film formed of polyimide can be arranged on the side of each of the substrates in contact with the liquid crystal layer.

In one embodiment, the liquid crystal layer contains liquid crystal molecules aligned in homeotropic alignment under a state in which no electric field is present. The term "liquid crystal molecules aligned in homeotropic alignment" refers to liquid crystal molecules in the following state: as a result of an interaction between an alignment-treated substrate and each of the liquid crystal molecules, the alignment vector of each of the liquid crystal molecules is vertically aligned relative to the plane of the substrate. Such liquid crystal layer (as a result, the liquid crystal cell) typically shows a three-dimensional refractive index of nz>nx=ny. A typical example of a drive mode using the liquid crystal layer showing such three-dimensional refractive index is a vertical alignment (VA) mode. The VA mode includes a multi-domain VA (MVA) mode.

In another embodiment, the liquid crystal layer contains liquid crystal molecules aligned in homogeneous alignment under a state in which no electric field is present. The term "liquid crystal molecules aligned in homogeneous alignment" refers to liquid crystal molecules in the following state: as a result of an interaction between an alignment-treated substrate and each of the liquid crystal molecules, the alignment vector of each of the liquid crystal molecules is aligned in a parallel and uniform manner relative to the plane of the substrate. Such liquid crystal layer (as a result, the liquid crystal cell) typically shows a three-dimensional refractive index of nx>ny=nz. Typical examples of a drive mode using the liquid crystal layer showing such three-dimensional refractive index include an in-plane switching (IPS) mode and a fringe field switching (FFS) mode. The above-mentioned IPS mode includes a super in-plane switching (S-IPS) mode and an advanced super in-plane switching (AS-IPS) mode, each of which adopts a V-shaped electrode, a zigzag electrode, or the like. In addition, the above-mentioned FFS mode includes an advanced fringe field switching (A-FFS) mode and an ultra fringe field switching (U-FFS) mode, each of which adopts a V-shaped electrode, a zigzag electrode, or the like.

C. Polarizer

Any appropriate polarizer may be adopted as each of the first polarizer, the second polarizer, and the third polarizer (hereinafter sometimes collectively simply referred to as "polarizers"). For example, a resin film for forming the polarizer may be a single-layer resin film, or may be a laminate of two or more layers.

Specific examples of the polarizer including a single-layer resin film include: a polarizer obtained by subjecting a hydrophilic polymer film, such as a polyvinyl alcohol (PVA)-based film, a partially formalized PVA-based film, or an ethylene-vinyl acetate copolymer-based partially saponified film, to dyeing treatment with a dichromatic substance, such as iodine or a dichromatic dye, and stretching treatment; and a polyene-based alignment film, such as a dehydration-treated product of PVA or a dehydrochlorination-treated product of polyvinyl chloride. A polarizer obtained by dyeing the PVA-based film with iodine and uniaxially stretching the resultant is preferably used because the polarizer is excellent in optical characteristics.

The dyeing with iodine is performed by, for example, immersing the PVA-based film in an aqueous solution of iodine. The stretching ratio of the uniaxial stretching is preferably from 3 times to 7 times. The stretching may be performed after the dyeing treatment, or may be performed while the dyeing is performed. In addition, the dyeing may be performed after the stretching has been performed. The PVA-based film is subjected to swelling treatment, cross-linking treatment, washing treatment, drying treatment, or the like as required. For example, when the PVA-based film is immersed in water to be washed with water before the dyeing, contamination or an antiblocking agent on the surface of the PVA-based film can be washed off. In addition, the PVA-based film is swollen and hence dyeing unevenness or the like can be prevented.

The thickness of the polarizer is preferably from 1 μm to 80 μm, more preferably from 10 μm to 50 μm, still more preferably from 15 μm to 40 μm, particularly preferably from 20 μm to 30 μm. When the thickness of the polarizer falls within such range, durability under high temperature and high humidity can be excellent.

The polarizer preferably shows absorption dichroism at any wavelength in the wavelength range of from 380 nm to 780 nm. The single axis transmittance of the polarizer is preferably from 40.0% to 46.0%, more preferably from 41.0% to 44.0% The polarization degree of the polarizer is preferably 97.0% or more, more preferably 99.0% or more, still more preferably 99.9% or more.

A protective layer (not shown) may be arranged on at least one surface of each of the first polarizer 20, the second polarizer 30, and the third polarizer 60. That is, each of the first polarizer 20, the second polarizer 30, and the third polarizer 60 may be incorporated as a polarizing plate into the liquid crystal display apparatus.

The protective layer is formed of any appropriate film that may be used as a protective layer for a polarizer. A material serving as a main component of the film is specifically, for example: a cellulose-based resin, such as triacetylcellulose (TAC); a transparent resin, such as a polyester-based, polyvinyl alcohol-based, polycarbonate-based, polyamide-based, polyimide-based, polyethersulfone-based, polysulfone-based, polystyrene-based, polynorbornene-based, polyolefin-based, (meth)acrylic, or acetate-based transparent resin; or a thermosetting resin or a UV-curable resin, such as a (meth)acrylic, urethane-based, (meth)acrylic urethane-based, epoxy-based, or silicone-based thermosetting resin or UV-curable resin. A further example thereof is a glassy polymer, such as a siloxane-based polymer. In addition, a polymer film disclosed in JP 2001-343529 A (WO 01/37007 A1) may be used. For example, a resin composition containing a thermoplastic resin having a substituted or unsubstituted imide group on a side chain thereof, and a thermoplastic resin having a substituted or unsubstituted phenyl group and a nitrile group on side chains thereof may be used as the material for the film, and the composition is, for example, a resin composition having an alternating copolymer formed of isobutene and N-methylmaleimide, and an acrylonitrile-styrene copolymer. The polymer film may be, for example, an extrudate of the resin composition.

The thickness of the protective layer is typically 5 mm or less, preferably 1 mm or less, more preferably from 1 μm to 500 μm, still more preferably from 5 μm to 150 μm. When the surface treatment is performed, the thickness of the protective layer is a thickness including the thickness of a surface treatment layer.

When the protective layer (hereinafter referred to as "inner protective layer") is arranged on the liquid crystal cell side of the first polarizer 20, the second polarizer 30, and/or the third polarizer 60, the inner protective layer is preferably optically isotropic. The phrase "be optically isotropic" refers to having an in-plane retardation Re(550) of from 0 nm to 10 nm and a thickness direction retardation Rth(550) of from −10 nm to +10 nm. The inner protective layer may include any appropriate material as long as the inner protective layer is optically isotropic. The material may be appropriately selected from, for example, the materials described above for the protective layer.

The thickness of the inner protective layer is preferably from 5 μm to 200 μm, more preferably from 10 μm to 100 μm, still more preferably from 15 μm to 95 μm.

D. Cover Sheet

When the liquid crystal display apparatus is used by being incorporated into a structure, the cover sheet 40 may be typically arranged in response to a demand in terms of the protection and/or design of the liquid crystal display apparatus. Therefore, the cover sheet 40 typically has an opening portion corresponding to the display region of the liquid crystal cell in order that the display function of the liquid crystal display apparatus may not be inhibited.

The cover sheet may include any appropriate material. A typical example of the constituent material is a resin. This is because of the following reasons: the resin has a strength appropriate as the cover sheet; and the resin can be easily formed into a desired shape, and facilitates the formation of an opening portion. Specific examples of the resin include polyarylate, polyamide, polyimide, polyester, polyaryletherketone, polyamide-imide, polyesterimide, polyvinyl alcohol, polyfumarate, polyethersulfone, polysulfone, a norbornene resin, a polycarbonate resin, a cellulose resin, and polyurethane. Those resins may be used alone or in combination thereof.

In one embodiment, the cover sheet has a light-shielding property. The light-shielding property can be imparted by blending the resin with a light-shielding material (e.g., carbon black) at the time of forming into the cover sheet.

The thickness of the cover sheet is preferably from 0.1 mm to 5 mm, more preferably from 0.3 mm to 3 mm. Such thickness can achieve a strength appropriate as a protective member for the liquid crystal display apparatus. According to the present invention, as described above, a physical step that occurs owing to such thickness of the cover sheet can be eliminated, and a visual step can be significantly reduced.

E. Pressure-Sensitive Adhesive Layer

In the embodiment of the present invention, as described above, the opening portion of the cover sheet 40 is filled with the pressure-sensitive adhesive. As a result, an air layer formed by the opening portion is eliminated, and hence reflection and/or refraction at a layer interface can be suppressed. As a result, the visual step of the apparatus can be more significantly reduced while the brightness of the display screen thereof is maintained.

As described above, the refractive index of the pressure-sensitive adhesive is preferably from 1.30 to 1.70, more preferably from 1.40 to 1.60, still more preferably from 1.45 to 1.55. When the refractive index of the pressure-sensitive adhesive is set within such range, the reflection and/or the refraction at the layer interface can be further suppressed, and hence balance between the brightness of the display screen and the visual step can be more excellent.

A difference between the refractive index of the pressure-sensitive adhesive and the refractive index of a layer adjacent to the pressure-sensitive adhesive is preferably 0.20 or less, more preferably from 0 to 0.15. When the difference between the refractive index of the pressure-sensitive adhesive and the refractive index of the adjacent layer is set within such range, the above-mentioned effect in the case where the refractive index of the pressure-sensitive adhesive is set within a predetermined range may be further accelerated.

As described above, the pressure-sensitive adhesive may fill only the opening portion, or may be part of the pressure-sensitive adhesive layer 80 arranged between the cover sheet 40 and the third polarizer 60. In the latter case, the thickness of the pressure-sensitive adhesive layer (thickness except a portion corresponding to the opening portion of the cover sheet) may be appropriately set in accordance with purposes, an adhesive strength, and the like. The thickness of the pressure-sensitive adhesive layer is preferably from 1 μm to 500 μm, more preferably from 1 μm to 200 μm, still more preferably from 1 μm to 100 μm.

The pressure-sensitive adhesive layer may include any appropriate pressure-sensitive adhesive having such characteristics as described above. Specific examples thereof include pressure-sensitive adhesives containing, as base polymers, an acrylic polymer, a silicone-based polymer, polyester, polyurethane, polyamide, polyether, a fluorine-based polymer, and a rubber-based polymer. Of those, a pressure-sensitive adhesive containing, as a base polymer, an acrylic polymer (acrylic pressure-sensitive adhesive) is preferred. The reason is that excellent optical transparency, moderate pressure-sensitive adhesive characteristics (wettability, cohesive property, and adhesive property), and excellent weatherability and heat resistance can be obtained.

EXAMPLES

Now, the present invention is specifically described byway of Examples. However, the present invention is not limited by these Examples. Measurement methods for characteristics are as described below.

(1) Physical Step

The presence or absence of the unevenness of the viewer side surface of a liquid crystal display apparatus obtained in each of Examples and Comparative Examples was confirmed.

(2) Visual Step

Under a state in which the liquid crystal display apparatus obtained in each of Examples and Comparative Examples was caused to actually display an image, a step was visually observed. An evaluation was performed by the following criteria.

A: Substantially no step is recognized and hence no problem occurs in the viewing of the image.

B: A step is recognized but substantially no influence on the viewing of the image occurs.

C: Such a step that a feeling of incongruity occurs in the viewing of the image is recognized.

D: A step is recognized so clearly that the viewing of the image is largely affected.

(3) Brightness of Display Screen

A brightness when a white color was displayed on the entire screen of the liquid crystal display apparatus obtained in each of Examples and Comparative Examples was measured. An evaluation was performed through the use of a brightness ratio when the brightness of Comparative Example 1 was defined as 100% by the following criteria.

A: Brightness ratio of more than 90%
B: Brightness ratio of from 80% to 90%
C: Brightness ratio of from 70% to 80%
D: Brightness ratio of less than 70%

Example 1

(i) Polarizing Plate

Three commercial polarizing plates (manufactured by Nitto Denko Corporation, product name: "CWQ1463VCUHC") were prepared, and were defined as a first polarizing plate (polarizer), a second polarizing plate (polarizer), and a third polarizing plate (polarizer).

(ii) Cover Sheet

A commercial methacrylic resin sheet (manufactured by Nitto Jushi Kogyo Co., Ltd., product name: "FLAT N-885", thickness: 1.0 mm) was used, and its portion corresponding to a display region of a liquid crystal cell to be described later was punched to provide an opening portion.

(iii) Liquid Crystal Cell

A liquid crystal panel was removed from a product available under the product name "plus one" (IPS mode) from Century Corporation. Further, optical films bonded to the top and bottom of the liquid crystal cell were removed, and the surfaces from which the optical films had been removed were washed. A liquid crystal cell thus obtained was used.

(iv) Production of Liquid Crystal Display Apparatus

The polarizing plate (second polarizer) described in the (i), the cover sheet described in the (ii), and the polarizing plate (third polarizer) described in the (i) were bonded to one surface of the liquid crystal cell in the stated order from a liquid crystal cell side. The cover sheet was bonded so that its opening portion corresponded to the display region of the liquid crystal cell. The third polarizer and the cover sheet were bonded to each other with a pressure-sensitive adhesive (manufactured by Nitto Denko Corporation, product name: "CS99110", thickness: 250 μm, storage modulus of elasticity G'=120 kPa), and the opening portion of the cover sheet was filled with the pressure-sensitive adhesive. In this example, the opening portion was filled by superimposing four layers each formed of the pressure-sensitive adhesive. Further, the polarizing plate (first polarizer) described in the (i) was bonded to the other surface of the liquid crystal cell. Here, the respective optical films were bonded so that the absorption axis of the first polarizer and the absorption axis of the second polarizer were perpendicular to each other and the absorption axis of the second polarizer and the absorption axis of the third polarizer were parallel to each other. Further, a backlight unit removed from the "plus one" described in the (iii) was incorporated into the outside of the first polarizer. Thus, a liquid crystal display apparatus was produced. The resultant liquid crystal display apparatus was subjected to the evaluations (1) to (3). The results are shown in Table 1.

Comparative Example 1

A liquid crystal display apparatus was produced in the same manner as in Example 1 except that the third polarizer was not arranged, i.e., the cover sheet was used as the outermost layer. The resultant liquid crystal display apparatus was subjected to the same evaluations as those of Example 1. The results are shown in Table 1.

Comparative Example 2

A liquid crystal display apparatus was produced in the same manner as in Example 1 except that a commercial neutral density filter (manufactured by Fujifilm Corporation, product name: "NEUTRAL DENSITY FILTER ND-0.2", transmittance: 64%) was bonded instead of the third polarizer. The resultant liquid crystal display apparatus was subjected to the same evaluations as those of Example 1. The results are shown in Table 1.

Comparative Example 3

A liquid crystal display apparatus was produced in the same manner as in Example 1 except that: the third polarizer and the cover sheet were bonded to each other with a typical acrylic pressure-sensitive adhesive; and the opening portion of the cover sheet was not filled. The resultant liquid crystal display apparatus was subjected to the same evaluations as those of Example 1. The results are shown in Table 1.

TABLE 1

|  | Configuration on viewer side | Physical step | Visual step | Brightness |
|---|---|---|---|---|
| Example 1 | Third polarizer/cover sheet (opening portion is filled) | Absent | A | A (90) |
| Comparative Example 1 | Cover sheet | Present | D | A (100) |
| Comparative Example 2 | Neutral density filter/cover sheet | Absent | C | D (64) |
| Comparative Example 3 | Third polarizer/cover sheet (opening portion is not filled) | Absent | C | C (79) |

*A numerical value in parentheses in the column "Brightness" represents a brightness ratio (%) when the brightness of Comparative Example 1 is defined as 100%.

As is apparent from Table 1, in the liquid crystal display apparatus of each of Examples of the present invention, the physical step was eliminated, and balance between the visual step and the brightness of the display screen was excellent. In the liquid crystal display apparatus of Comparative Example 1 using the cover sheet as the outermost layer on its viewer side, the display screen was bright, but the physical step was not eliminated and the visual step was so remarkable as to affect the viewability of the apparatus. In the liquid crystal display apparatus of Comparative Example 2 using the neutral density filter, the physical step was eliminated, but both the brightness of the display screen and the degree of reduction of the visual step were poor. The visual step of the liquid crystal display apparatus of Comparative Example 3 in which the opening portion of the cover sheet was not filled was remarkable, though its brightness was improved as compared to that of Comparative Example 2.

INDUSTRIAL APPLICABILITY

The liquid crystal display apparatus of the present invention can be used for various applications, such as portable devices including a personal digital assistant (PDA), a cellular phone, a watch, a digital camera, and a portable gaming machine, OA devices including a personal computer monitor, a notebook-type personal computer, and a copying machine, household electric appliances including a video camera, a liquid crystal television set, a microwave oven, and AV equipment, on-board devices including a reverse monitor, a monitor for a car navigation system, and a car audio, exhibition devices including an information monitor for a commercial store, security devices including a surveillance monitor, and caring/medical devices including a caring monitor and a medical monitor. In particular, the liquid crystal display apparatus of the present invention can be suitably used in the form of being embedded in a structure.

REFERENCE SIGNS LIST 10 liquid crystal cell
20 first polarizer
30 second polarizer
40 cover sheet
60 third polarizer
80 pressure-sensitive adhesive layer
100 liquid crystal display apparatus

The invention claimed is:
1. A liquid crystal display apparatus, comprising:
   a liquid crystal cell;
   a first polarizer arranged on a back surface side of the liquid crystal cell;
   a second polarizer arranged on a viewer side of the liquid crystal cell;
   a cover sheet arranged directly on a viewer side of the second polarizer, the cover sheet having an opening portion at a position corresponding to a display region of the liquid crystal cell; and
   a third polarizer arranged on a viewer side of the cover sheet to cover the opening portion,
   wherein the opening portion of the cover sheet is filled with a pressure-sensitive adhesive, and
   wherein the cover sheet only partially overlaps with the second polarizer.
2. The liquid crystal display apparatus according to claim 1, wherein the pressure-sensitive adhesive comprises part of a pressure-sensitive adhesive layer arranged between the cover sheet and the third polarizer.
3. The liquid crystal display apparatus according to claim 1, wherein the pressure-sensitive adhesive has a refractive index of from 1.30 to 1.70.
4. The liquid crystal display apparatus according to claim 1, wherein a difference between a refractive index of the pressure-sensitive adhesive and a refractive index of a layer adjacent to the pressure-sensitive adhesive is 0.2 or less.

* * * * *